United States Patent [19]

Zimmer et al.

[11] Patent Number: 4,554,024

[45] Date of Patent: Nov. 19, 1985

[54] METHOD FOR PREPARING AN IMPROVED PITCH IMPREGNANT FOR A CARBON-CARBON COMPOSITE

[75] Inventors: James E. Zimmer, San Jose; Linda M. Salvador, Fremont, both of Calif.

[73] Assignee: The United States of America as represented by the Secretary of the Air Force, Washington, D.C.

[21] Appl. No.: 579,625

[22] Filed: Feb. 13, 1984

[51] Int. Cl.$^4$ ............................................. C08L 95/00
[52] U.S. Cl. ........................ 106/284; 106/273 R; 427/249; 427/227; 428/408
[58] Field of Search ............... 106/284, 273; 208/22, 208/45; 427/249; 428/408

[56] References Cited

U.S. PATENT DOCUMENTS 3,382,084  5/1968  Folkins et al. ....................... 106/284
4,131,708  12/1978  Moores et al. ...................... 428/257
4,201,611  5/1980  Stover ................................. 156/155
4,318,824  5/1982  Turner ................................ 252/421

*Primary Examiner*—Paul Lieberman
*Assistant Examiner*—John F. McNally
*Attorney, Agent, or Firm*—Donald J. Singer; Charles E. Bricker

[57] ABSTRACT

A pitch fraction for impregnating a carbon fiber reinforcing structure which represents the portion of a pitch which is insoluble in cyclohexane and soluble in pyridine.

Also provided is a carbon fiber-reinforced carbon-carbon composite made by impregnating a multidirectional carbon fiber reinforcing structure with the above-described pitch fraction, carbonizing the pitch and graphitizing the resulting structure.

4 Claims, 9 Drawing Figures

FIG.I(a)
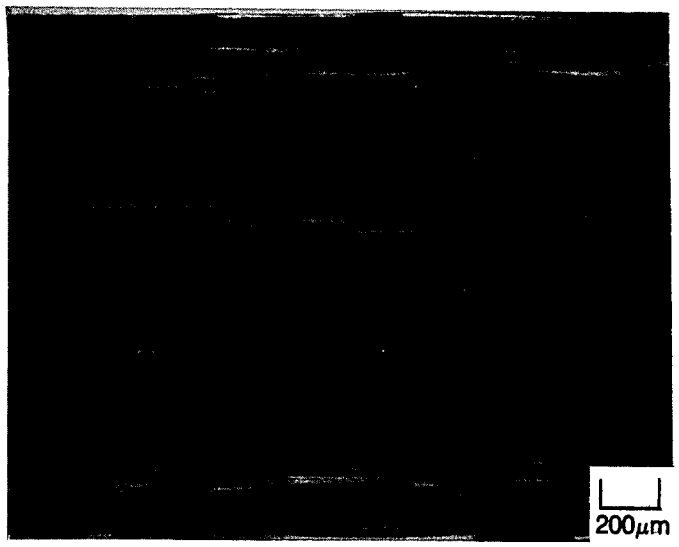
FIG.I(b)

METHOD FOR PREPARING AN IMPROVED PITCH IMPREGNANT FOR A CARBON-CARBON COMPOSITE

RIGHTS OF THE GOVERNMENT

The invention described herein may be manufactured and used by or for the Government of the United States for all governmental purposes without the payment of any royalty.

BACKGROUND OF THE INVENTION

This invention relates to carbon-carbon composite materials.

Reinforced composites are used in a wide variety of applications. The best known composites are made from two-dimensional fabrics and/or fibers dispersed in a resin or plastic matrix. These composites are basically a resin or plastic structure to which reinforcing fabrics or fibers have been added to enhance the physical properties of the structure.

Advances in the field of aerospace technology have created a need for high strength, temperature-resistant materials. For many applications, this need is satisfied by carbon-carbon composite materials.

A wide range of multidirectional reinforced composite structures are now available. The simplest of these structures is obtained by stacking unidirectional fibers or sheets with alternating layers oriented in different directions, or by stacking woven sheets. More complex structures provide three-dimensional reinforcement. The simplest of the three-dimensional structures is the three-directional (3D) structure which generally has reinforcing elements which are mutually orthogonal. The most complex three-dimensional structure is a thirteen-directional (13D) structure. The thirteen directions, with reference to a cube, form three subgroups; the three edges, the four long diagonals, and the six diagonals of the faces.

The reinforced carbon-carbon composite structures are fabricated from graphite or carbon yarn or rods. The term yarn includes continuous filament yarns as well as yarns spun from short fibers, and comprises a plurality of filaments or fibers combined to make up a desired end count. Rods are produced by a pultrusion process whereby unidirectional groups of carbon or graphite yarn are assembled and impregnated with a thermosetting or thermoplastic resin or binder. The impregnated yarn groups are drawn through a die which is warmed to a desired temperature and which has a suitable shape.

The carbon or graphite yarns or rods are assembled into the desired geometric structure. If desired, the yarn may be impregnated with a suitable resin or binder prior to assembly.

The composite is formed either by sintering the reinforcement structure by solidifying the impregnated precursor, thereby avoiding the requirement for other materials, or by the dry or the liquid process, or by a combination of these methods. The dry process consists of depositing pyrolytic carbon inside the structure of the reinforcement by decomposition of a hydrocarbon gas such as methane. In the liquid process, the porous texture of the reinforcement is impregnated with a thermosetting resin or a thermoplastic carbon precursor, such as a phenolic resin, a furanyl resin, petroleum pitch, coal tar pitch, or the like, that is converted to carbon by heat treatment. Following carbonization, the structure is graphitized. The impregnation, carbonization, graphitization cycle is repeated as often as necessary to densify the composite to a desired degree.

The process of densification of the composite generally comprises heat treatment at a temperature in the range of 2500° to 3000° C. and may comprise isostatic pressing at a pressure up to about 15,000 psi in an oxygen-free environment.

Many applications for carbon-carbon composites have been proposed or implemented. The use of such composites for re-entry heat shield applications has been demonstrated. Ehrenreich, U.S. Pat. No. 3,672,936, discloses disk brake pads made of such composites. The use of these materials for turbine disk and blade components, for propulsion system nozzles, thrust chambers, and ramjet combustion liners, and for re-entry vehicle nosetip applications has been investigated.

It is known that the void space of reinforcing structures densified using pitch is incompletely filled. It is believed that volatile components of the pitch form their own escape routes during the carbonization step(s), leaving behind small voids in the densified structure. We have discovered that the size of such voids can be reduced without otherwise altering the bulk density of a densified reinforcing structure.

Accordingly, it is an object of the present invention to provide an improved method for fabricating a densified carbon-carbon reinforcing structure.

Another object of the present invention is to provide an improved pitch for densifying a reinforcing structure.

Other objects and advantages of the invention will be readily apparent to those skilled in the art from a reading of the following detailed description and the appended claims.

SUMMARY OF THE INVENTION

In accordance with the present invention there is provided an improved method for fabricating a densified carbon-carbon reinforcing structure which comprises providing a multidirectional reinforcement structure consisting essentially of carbon fibers oriented in particular directions, providing a solvent-extracted pitch representing the fraction of pitch which is insoluble in cyclohexane and soluble in pyridine, impregnating the reinforcement structure with the solvent-extracted pitch, carbonizing the impregnated structure, graphitizing the thus-carbonized structure, and repeating the impregnation, carbonization and graphitization steps to densify the resulting composite to a desired degree.

Also in accordance with the invention there is provided an improved pitch for densifying a reinforcing structure which is obtained by extracting the pitch with cyclohexane, discarding the material which is soluble therein, extracting the cyclohexane insoluble with pyridine, discarding the material which is insoluble therein, and recovering the extracted material from the pyridine.

BRIEF DESCRIPTION OF THE DRAWINGS

In the drawings,

FIGS. 1a and 1b are optical micrographs, at two magnifications, of a 2-2-3 composite after impregnation with petroleum pitch and carbonization at atmospheric pressure;

DETAILED DESCRIPTION OF THE INVENTION

Figure 5:
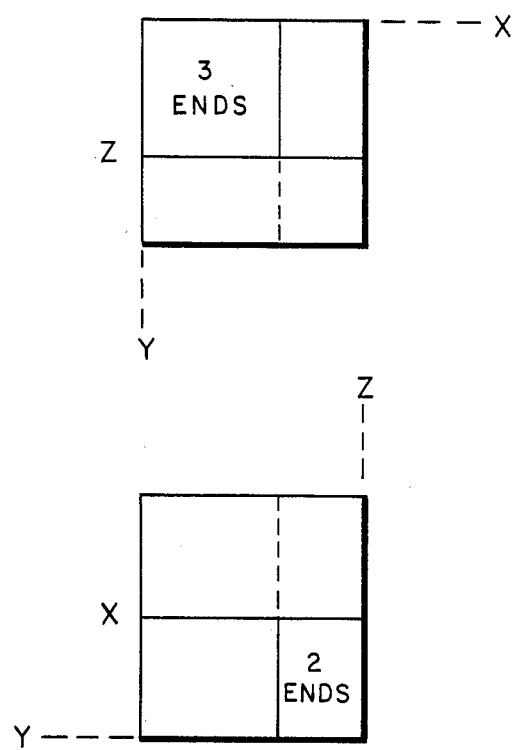
FIG. 5 is a schematic illustration of a sectioned structure of a 2-2-3 carbon-carbon composite.

The present invention contemplates the fabrication of a high density, fine textured carbon-carbon composite material particularly adapted for use in the fabrication of nose tips for reentry vehicles. As indicated previously, a wide range of multidirectional reinforced composite structures are now available. A relatively simple three-dimensional (3-D) structure is shown in FIG. 5. This particular structure is described in greater detail in Stover, U.S. Pat. No. 4,201,611, which is incorporated herein by reference. This structure is mutually orthogonal, with the elements aligned in the direction of the x, y and z axes. The elements are fabricated by a pultrusion process whereby unidirectional groups of graphite or carbon yarns having sufficient fibers to make up a desired end count are assembled and impregnated with a thermosetting or thermoplastic resin or binder. Examples of suitable carbon or graphite yarns include Thornel 50 or Thornel 300, available commercially from Union Carbide Company, and HM 1000 or HM 3000, available commercially from Hercules, Inc. Inc. Suitable thermosetting resins include phenolic, epoxy and furanic resins; suitable thermoplastic resins include coal tar pitch, petroleum pitch, polyvinyl acetate, acrylic resin, and the like.

The impregnated yarn groups are drawn through a die which is warmed to a suitable temperature and which has a suitable shape. The specific temperature of the die is determined by the cure characteristics or thermoplastic characteristics of the particular resin or binder.

In the example shown in FIG. 5, the z group of elements have a substantially square cross section and the X and Y elements have a rectangular cross section. The ratio of the end counts of the X:Y:Z elements is 2:2:3. The structure is referred to simply as a 223 composite.

The elements are assembled into the desired geometric reinforcing structure. The assembly process may, for example, consist of stacking alternate and adjacent sheets of spaced apart Z and X elements followed by insertion of the Y elements to complete the aforesaid structure. When all the interstices have thus been filled, the reinforcement is finished and can be coated as described below.

The reinforcing structure is then processed to a high density (1.8 g/cc or greater) in accordance with the following procedure. The reinforcing structure is first impregnated with pitch, as described below. The impregnated preform is then heated at a controlled rate, e.g., 6° C./hr to about 650° to 725° C., to convert carbonizable material to carbon. The thus-baked impregnated preform is then graphitized at a temperature of about 2300° C. to 2750° C. The impregnation, carbonization and graphitization cycle is repeated as necessary, generally 3 or 4 times, to fill the interstices of the reinforcement to a desired degree. The impregnation and carbonization steps may be conducted at atmospheric pressure or at an elevated pressure.

The pitch employed for impregnating the reinforcing structure in accordance with the invention is a particular fraction which is defined as being insoluble in cyclohexane and soluble in pyridine. This fraction may be obtained from a petroleum pitch, such as, for example, A240 petroleum pitch, available from Ashland Petroleum Co., Ashland, KY, or from coal-tar pitch, such as, for example, 15V coal-tar pitch, available from Allied Chemical, Morristown, NJ.

Figure 2A:
FIGS. 2a and 2b are optical micrographs, at two magnifications, of a 2-2-3 composite after impregnation with solvent-extracted petroleum pitch and carbonization at atmospheric pressure.
Figure 2B:
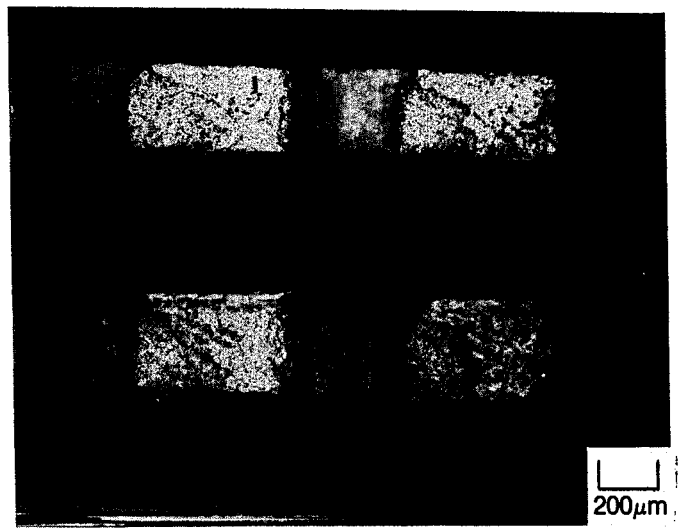

The advantages resulting from the use of the above solvent-extracted pitches are shown in FIGS. 1-4. FIGS. 1 and 2 are optical micrographs of a 223 composite (x-direction normal to the micrograph), impregnated with A240 petroleum pitch and carbonized at atmospheric pressure. In the structure shown in FIG. 1, the A240 pitch was used as received; in FIG. 2 the 240 pitch was solvent-extracted in accordance with the invention prior to use. In the structure of FIG. 2, the fiber bundles are better filled, i.e., smaller voids in the fiber bundles.

Figure 3A:
FIGS. 3a and 3b are optical micrographs, at two magnifications, of a 2-2-3 composite after impregnation with a coal-tar pitch and carbonization at 103 MPa pressure.
Figure 3B:
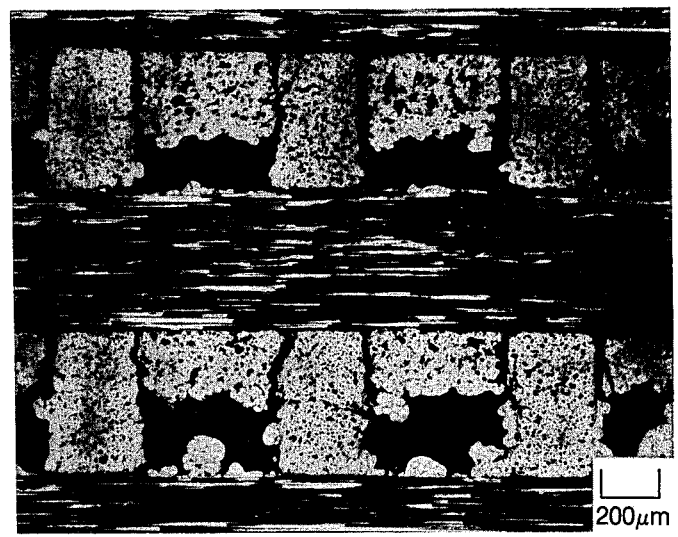
Figure 4A:
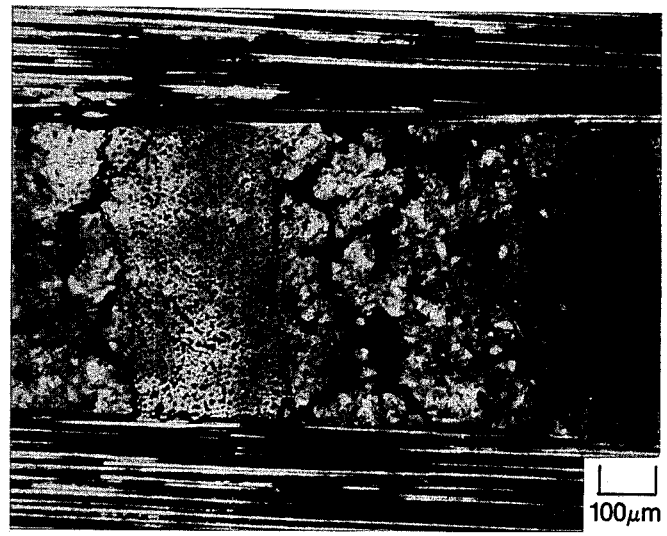
FIGS. 4a and 4b are optical micrographs, at two magnifications, of a 2-2-3 composite after impregnation with solvent-extracted coal-tar pitch and carbonization at 103 MPa pressure.
Figure 4B:
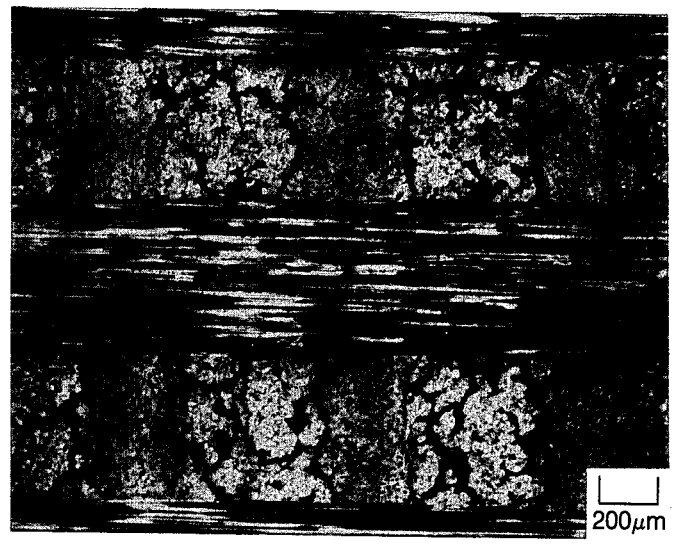

FIGS. 3 and 4 are optical micrographs of a 223 composite (x-direction normal to the micrograph) impregnated with 15V coal-tar pitch and carbonized at 103 MPa pressure. In the structure shown in FIG. 3, the 15V pitch was used as received; in FIG. 4, the 15V pitch was solvent-extracted in accordance with the invention prior to use. For both FIGS. 3 and 4, the fiber bundles have many small pores, presumably due to the retention of escaping volatiles by the external pressure. It can be seen, however, in FIG. 4 that the solvent-extracted pitch better fills the matrix pockets between the fiber bundles. As seen in FIG. 3 the as-received pitch provides a composite having relatively large voids in the matrix pockets. In contrast, as seen in FIG. 4, the solvent-extracted pitch provides a composite having voids of smaller cross section which are more uniformly distributed through the matrix pockets.

The pitch is treated with solvent using about 4 to 10 parts of solvent per part by weight of pitch, at a temperature of about 80° to 120° C. in a liquid phase extraction process. The extraction step is carried out using either batch or continuous extraction methods and the recovered solvent may be reused in the process.

In a presently preferred process, the pitch is first ground to about 60 mesh or less and then washed with a hexane-toluene mixture (about 30:1 to 40:1, v/v) to keep the particles of pitch from agglomerating during the extraction. This mixture is filtered and the solids dried. The dried pitch particles are transferred to an extractor apparatus and extracted with cyclohexane until the solvent, after passing through the pitch particles, is relatively clear. The pitch particles are then extracted with pyridine until the solvent, after passing through the pitch particles, is relatively clear. The cyclohexane-insoluble, pyridine-soluble fraction is recovered from the pyridine by evaporation of the pyridine.

Various modifications may be made without departing from the spirit of the invention and the scope of the appended claims.

We claim:

1. In a process for producing a carbon fiber-reinforced carbon-carbon composite comprising the steps of impregnating a multidirectional carbon fiber reinforcing structure with a pitch, carbonizing said pitch and graphitizing the resulting structure, the improvement which comprises solvent extracting said pitch sequentially with cyclohexane and pyridine and impregnating said reinforcing structure with the fraction which is insoluble in cyclohexane and soluble in pyridine.

2. The process of claim 1 wherein said carbon fiber reinforcing structure is a 223 composite.

3. The process of claim 1 wherein said pitch is a petroleum pitch.

4. The process of claim 1 wherein said pitch is a coal-tar pitch.

* * * * *